Patented Aug. 17, 1926.

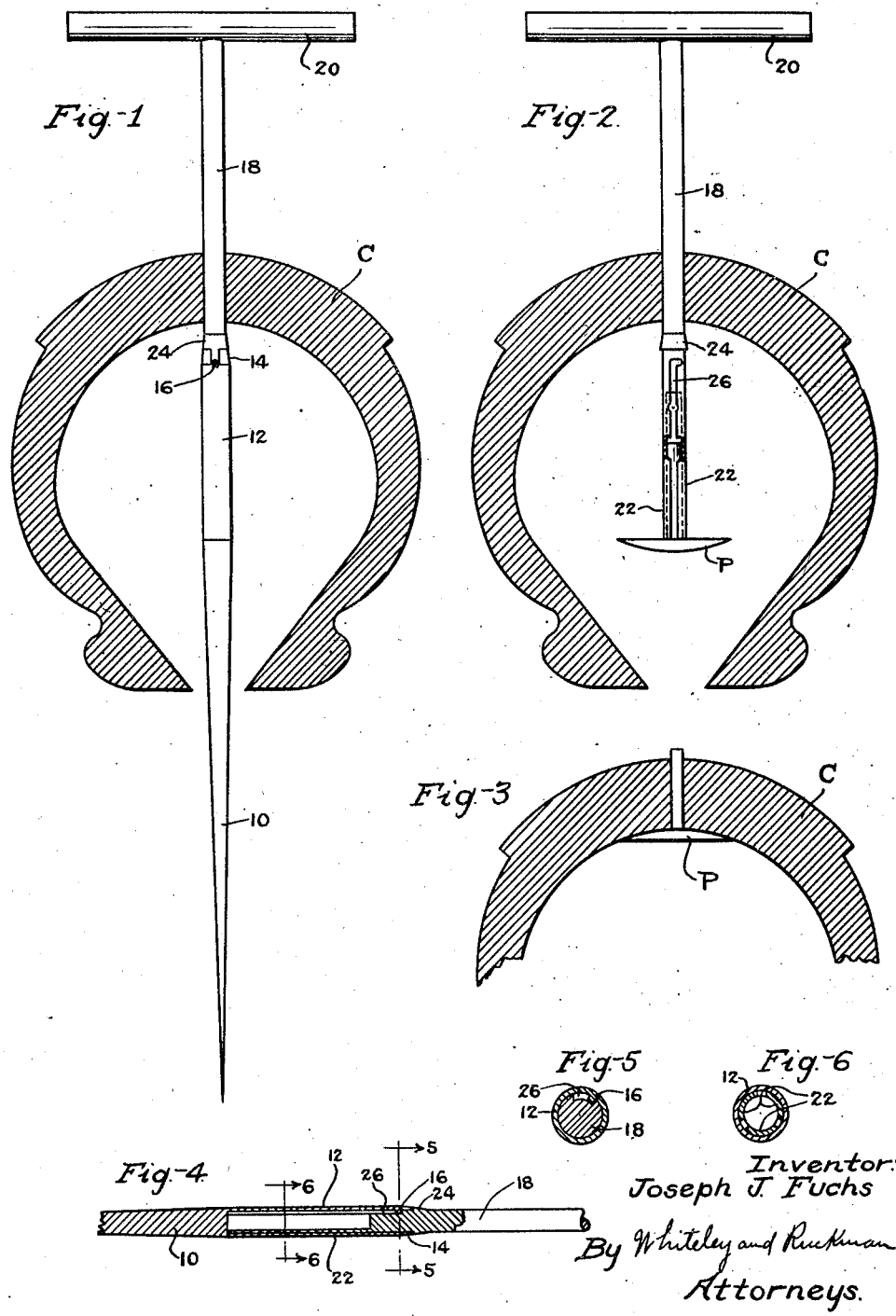

1,596,822

UNITED STATES PATENT OFFICE.

JOSEPH J. FUCHS, OF MINNEAPOLIS, MINNESOTA.

TIRE-REPAIRING TOOL.

Application filed May 8, 1926. Serial No. 107,605.

My invention relates to tire repairing tools. Holes are sometimes cut in tire casings by nails and other sharp objects which are encountered on the roadway. Such holes are apt to have an injurious effect on the casing and the inner tube since they permit entrance of water and grit. An object, therefore, of my invention is to provide a tire repairing tool by means of which such holes may be closed by rubber plugs inserted from the inside of the casing by application of the tool from the outside of the casing.

The full objects and advantages of my invention will appear in connection with the detailed description thereof, and the novel features of my inventive idea will be particularly pointed out in the claims.

In the accompanying drawings which illustrate a practical embodiment of my invention, Fig. 1 is an elevational view of the tool in its assembled condition illustrating the manner of using same in connection with a tire casing. Fig. 2 is a view of the upper member of the tool showing a plug held thereby for insertion in a hole of the casing. Fig. 3 is a view showing the plug inserted in the casing. Fig. 4 is a view of the assembled tool in longitudinal section with the end portions broken away. Fig. 5 is a view in cross section on the line 5—5 of Fig. 4. Fig. 6 is a view in cross section on the line 6—6 of Fig. 4.

Referring to the construction shown in the drawings, it will be noted that the tool consists of two members which have telescopic engagement with each other to the extent shown in Fig. 4. The lower member consists of a long tapering needle portion 10 which is solid and joins with a hollow cylindrical portion 12 terminating in a short beveled portion 14. A tongue 16 is formed by making two parallel cuts in the beveled portion 14 longitudinally of the tool and turning inwardly the material between these cuts. The upper member consists of a shank 18 having a handle member 20 at one end. The shank 18 is cylindrical and solid for a considerable portion of its length below the handle member while the lower portion is hollow and split longitudinally in three places to form three spring fingers 22 which are adapted to fit slidably within the hollow portion 12 of the lower member. Above the split portion, the shank 18 is provided with a short beveled portion 24 adapted to fit against the beveled portion 14 of the lower member and thus prevent an exposed shoulder when the two members are fitted together. One of the gaps between two of the spring fingers 22 is extended in the form of a bayonet slot 26 which receives the tongue 16 for holding the two members together.

The operation and advantages of my invention will now be obvious. In use, the two members are assembled and the point of the needle end is pushed through the hole in the casing C from the outside of the latter until the shank 18 is positioned in the hole as shown in Fig. 1. The needle member is then detached and the shank of a rubber plug P is inserted in the hollow strip portion of the upper member as shown in Fig. 2 whereupon this member is pulled upwardly, thus leaving the plug P in the position shown in Fig. 3. The provision of the handle 20 makes it an easy matter to insert and remove the tool. The tool may be used as a feeler when the hole in the casing shows only on the inside. In order to do this, the point of the needle is pushed through the hole in the casing from the inside, and the point on the outside of the casing may be observed for properly locating the place where the tool is to be inserted.

I claim:

1. A tire repairing tool comprising a needle member, a shank member, means for attaching and detaching said members with relation to each other, and spring fingers on the inner end of said shank member.

2. A tire repairing tool comprising a needle member, a shank member, means for attaching and detaching said members with relation to each other, spring fingers on the inner end of said shank member, and a handle member on the outer end of said shank member.

3. A tire repairing tool comprising a needle member which tapers to a point at one end and which has a hollow cylindrical portion at the other end, a shank member, and spring fingers on the inner end of said shank member adapted to fit into said hollow portion.

4. A tire repairing tool comprising a needle member which tapers to a point at one end and which has a hollow cylindrical portion at the other end, a shank member, spring fingers on the inner end of said shank member adapted to fit into said hollow portion, and an inwardly extending projection on the inner end of said needle member, said shank member having a bayonet slot at its inner end for receiving said projection.

5. A tire repairing tool comprising a needle member which tapers to a point at one end and which has a hollow cylindrical portion at the other end, a shank member, spring fingers on the inner end of said shank member adapted to fit into said hollow portion, and a tongue on the inner end of said needle member formed by bending inwardly a portion of said hollow end, said shank member having a bayonet slot constituting an extension of the gap between two of said fingers and adapted to receive said tongue.

6. A tire repairing tool comprising a needle member which tapers to a point at one end and which has a hollow cylindrical portion at the other end terminating in a short beveled portion, a shank member, and spring fingers on the inner end of said shank member adapted to fit into said hollow portion, said shank member being cylindrical for the greater portion of its length and having a short beveled portion above said fingers which fits against said first mentioned beveled portion and prevents an exposed shoulder when the two members are assembled.

In testimony whereof I hereunto affix my signature.

JOSEPH J. FUCHS.